United States Patent [19]

Batty et al.

[11] Patent Number: 4,736,960

[45] Date of Patent: Apr. 12, 1988

[54] FOLDING WHEELCHAIRS

[75] Inventors: David O. Batty, Burnley; David F. Brady, Gateshead; Joseph W. N. Wilson, Doncaster, all of England

[73] Assignee: Remploy Limited, London, England

[21] Appl. No.: 905,423

[22] Filed: Sep. 10, 1986

[30] Foreign Application Priority Data

Sep. 10, 1985 [GB] United Kingdom ................. 8522386

[51] Int. Cl.[4] ................................................ B62B 3/02

[52] U.S. Cl. ...................................... 280/42; 280/649; 280/242 WC; 280/650

[58] Field of Search ...................... 297/37, 44, 52, 417, 297/DIG. 4; 280/242 WC, 249 WC, 639, 642, 643, 644, 42, 647, 649, 650, 657, 658

[56] References Cited

U.S. PATENT DOCUMENTS 4,025,088 5/1977 Rothschild .......................... 280/644
4,077,640 3/1978 Perego ............................... 280/650
4,322,093 3/1982 Otto ................................... 280/650

FOREIGN PATENT DOCUMENTS 37302 11/1930 France ............................... 280/650
345843 4/1931 United Kingdom .
957309 5/1964 United Kingdom .
1130530 10/1968 United Kingdom .
1446845 8/1976 United Kingdom .

*Primary Examiner*—John J. Love
*Assistant Examiner*—Richard Camby
*Attorney, Agent, or Firm*—Sughrue, Mion, Zinn, Macpeak and Seas

[57] ABSTRACT

A folding wheelchair includes a pair of side frames which are collapsible in their own planes. There is simultaneous collapse of two pairs of strut members. The collapsed wheelchair is very compact, even though the erected wheelchair is very reliable due, at least in part, to its avoidance of areas of high stress concentration. In alternatives, the scissor-like strut members are replaced by fixed struts so that collapse in the height direction is not accompanied by collapse in the width direction.

16 Claims, 7 Drawing Sheets

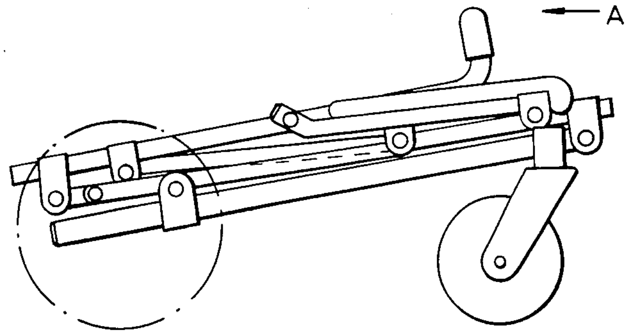
Fig.4.
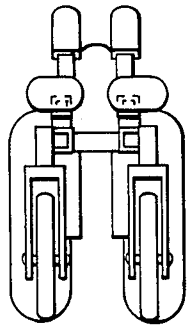
Fig.5.
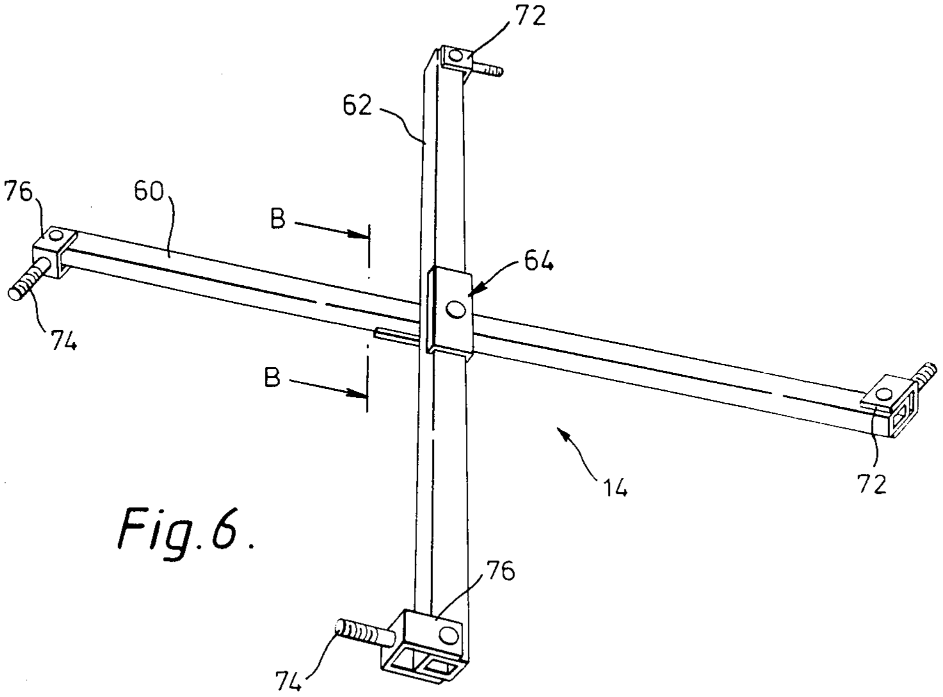
Fig.6.
Fig.7.
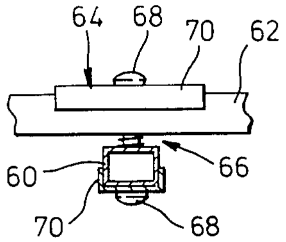

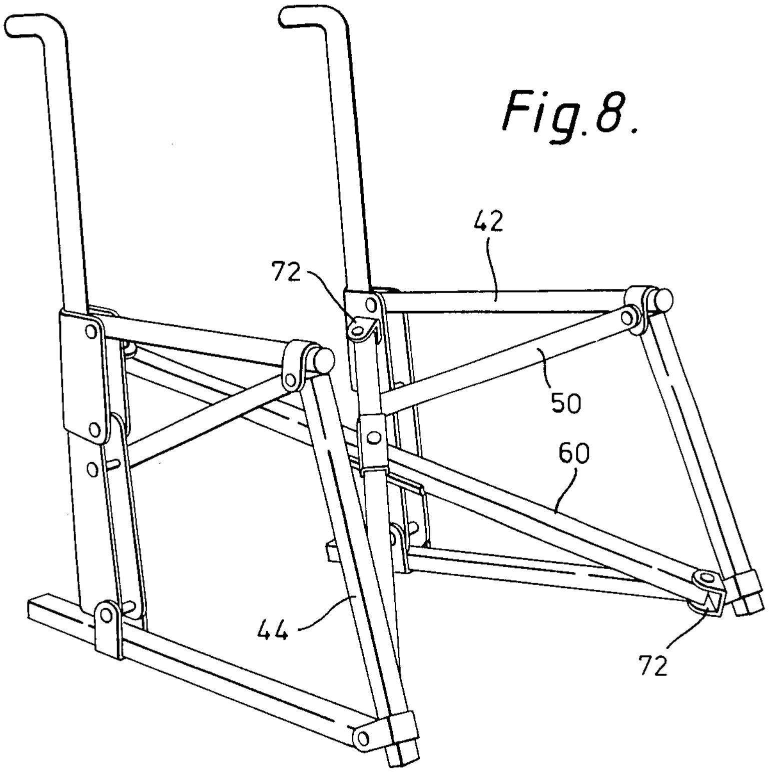
Fig. 8.
Fig. 9.
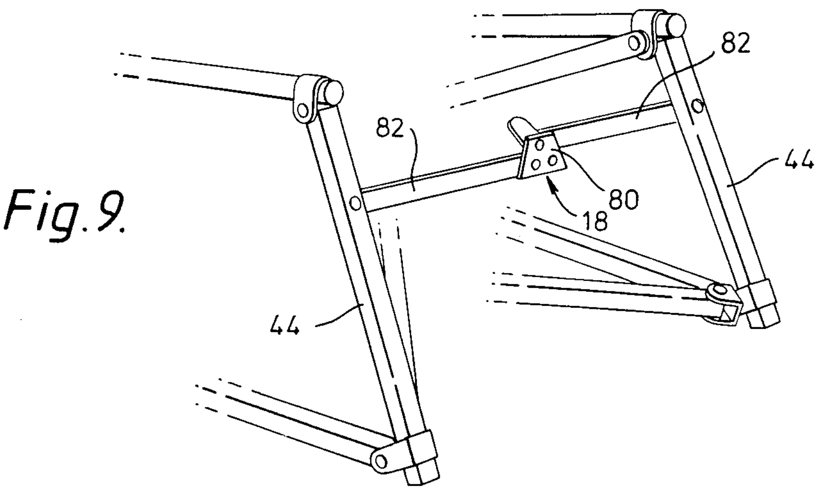

Fig. 10.
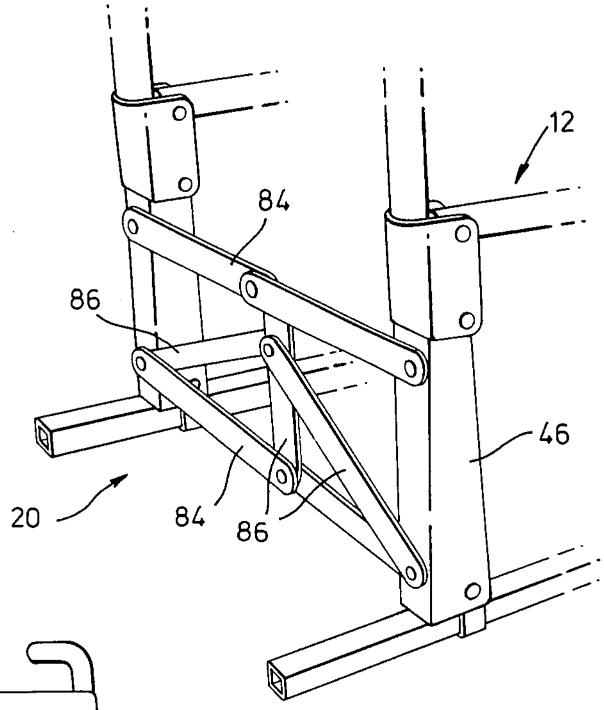
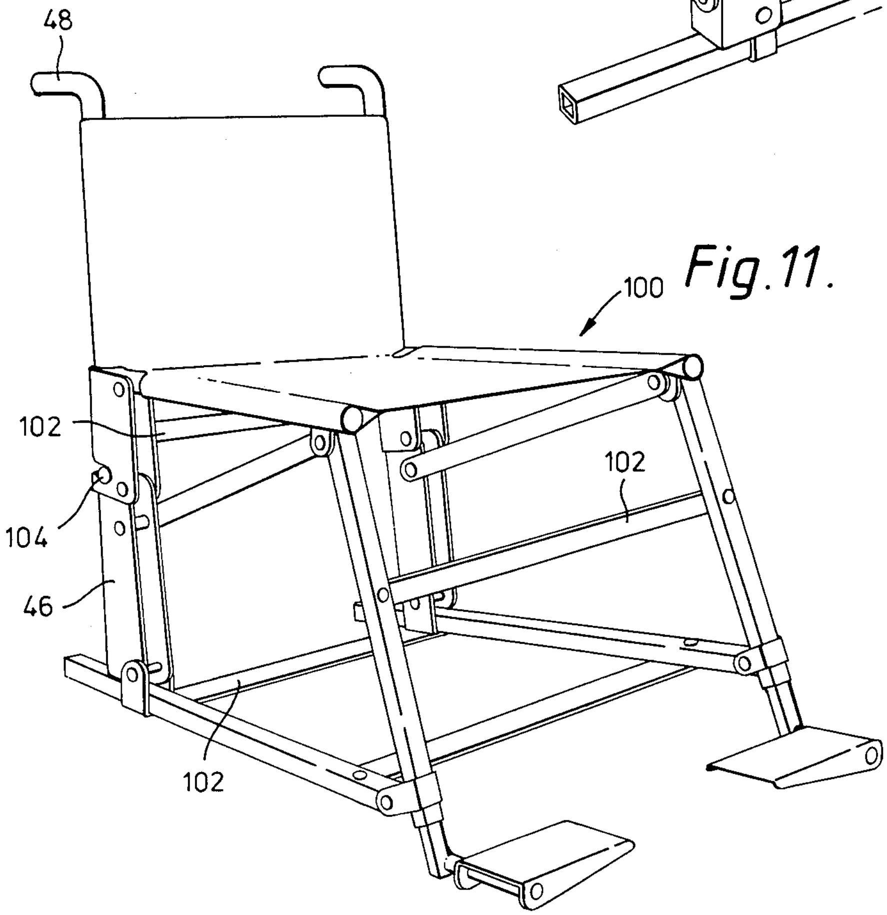
Fig. 11.

Fig. 12.
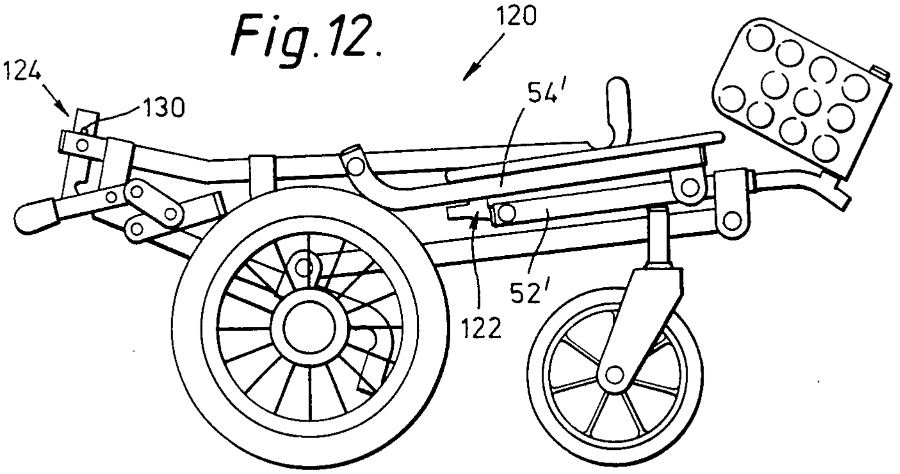
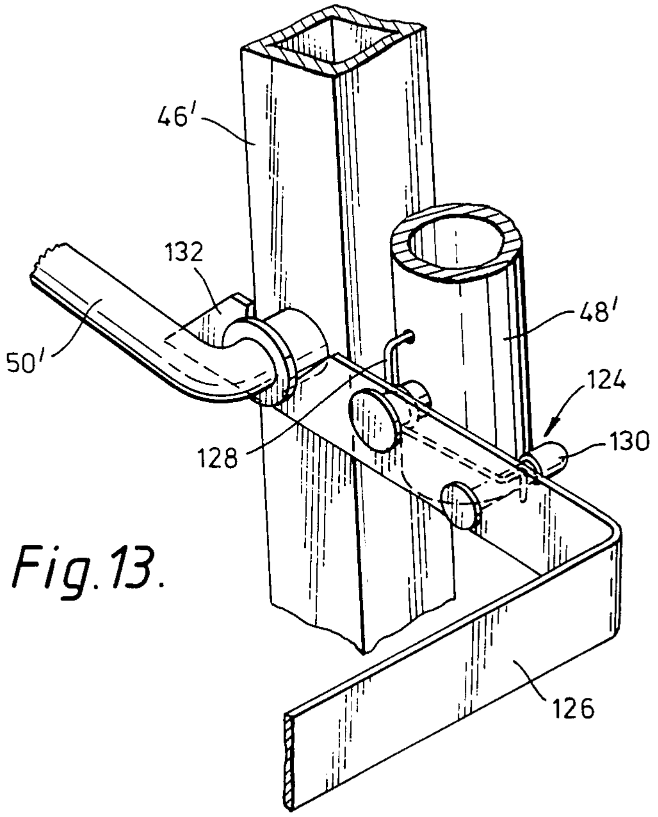
Fig. 13.

FOLDING WHEELCHAIRS

BACKGROUND OF THE INVENTION

The present invention relates generally to wheelchairs capable of use by infirm or disabled adults, and more particularly to wheelchairs capable of being folded between a collapsed condition for storage and an erected condition for use.

Traditionally, folding wheelchairs are constructed using two side frames connected together by an arrangement of folding struts. In the erected condition, the folding struts are laterally extended and keep the side frames apart and parallel at the appropriate wheelchair width. By causing the folding struts to lie close together, the wheelchair folds into the collapsed condition in which the side frames also lie close together, while remaining parallel.

It is known for the folding strut arrangement to be a scissors-like construction in which the folding struts are pivotally secured to one another mid-way along their lengths.

Naturally, a flexible chair seat which is stretched between the side frames when the wheelchair is erected is allowed to hang loosely between the side frames when the wheelchair is collapsed. Similarly, a flexible chair back may be located between a pair of backrest rails forming upper parts of the side frames. Alternatively, a rigid chair seat and back would need to be detached, possibly by unclipping, before the wheelchair is collapsed. The folded dimensions of the wheelchair when in the collapsed condition may then be further reduced by pivotally securing the backrest rails to allow the chair back to be folded above the chair seat.

It is usual for a pair of swivel-mounted castors to be provided at the front of the traditional folding wheelchair. A pair of relatively small wheels may be provided at the rear of the wheelchair if the wheelchair is to be attendant propelled, or a pair of relatively large wheels with hand grips may be provided at the rear of the wheelchair if the wheelchair is to be self-propelled. Detachable features of the traditional folding wheelchair are armrests and footrests, which are removed separately for storing in for example a car boot.

SUMMARY OF THE INVENTION

An aim of the present invention has been to provide various improvements such as reducing areas of high stress concentration, achieving an even greater reduction in size in the collapsed condition without necessarily having detachable features, and increasing reliability even after rough handling in the erected condition.

According to the present invention, a folding wheelchair comprises a pair of side frames, each having a portion carrying part of a seat and a portion carrying a pair of wheels, and each including a series of members which are pivotally secured together in a manner permitting said side frames to be collapsible in their own planes to move the seat carrying portions of said side frames towards the wheel carrying portions of said side frames.

Preferably, said side frames are connected by a folding strut arrangement which permits the wheelchair to collapse, simultaneously or consecutively, in its width direction as well as its height direction. Nevertheless, it is possible for said side frames to be connected by a fixed strut arrangement which is not capable of collapse in the width direction of the wheelchair.

In a particularly preferred folding wheelchair, according to the present invention, the structural members support each other in a fully integrated design when in the erected condition ready for occupation by a user, and the structural members move simultaneously to the collapsed condition to create a very compact package, which can be easily manhandled in and out of a car boot or other small storage area.

The side frames may each be lockable in the erected condition to form a closed load bearing assembly, and may be connected by a folding strut arrangement in conjunction with a folding lock arrangement, which may both be pivotally secured between the side frames.

In each of the series of members, there may be a lower frame unit which may carry a wheel location fitting at each end, to give a fixed wheel base, and a seat rail which may be secured as the name implies to an edge of a chair seat. The front wheel may be in the form of a swivel-mounted castor. A front support unit may be pivotally secured at one end to the front of the lower frame unit, and its other end to the front of the seat rail. A back support unit may be pivotally secured at one end to the rear of the lower frame unit, and at its other end to the lower end of a backrest rail. Again as the name implies, the backrest rail may be secured to an edge of a chair back. The rear wheel may be carried by the back support unit, rather than the lower frame unit, especially if the rear wheel is relatively large. The rear of the seat rail may be pivotally secured to the backrest rail above the location at which the backrest rail is pivotally secured to the back support unit. Finally, a connecting link may be pivotally secured at one end to the pivotal connection of the front support unit to the seat rail, and at its other end to the back support unit below the location at which the backrest rail is pivotally secured to the back support unit.

The closed assembly formed from the above-noted six members disperses applied load throughout the side frame thereby reducing areas of high stress concentration.

It should be noted that the pivotal connections between the various structural members need not necessarily be located at their ends but could instead be located near their ends or at least nearer one end than the other. Similar observations apply to the use of the terms front, rear, etc. For example, in one embodiment the pivotal connection between the lower frame unit and the back support unit may be located near the rear end of the lower frame unit and at the lower end of the back support unit. In another embodiment, however, the pivotal connection between the lower frame unit and the back support unit may be located at the rear end of the lower frame unit and near the lower end of the back support unit.

Each of the series of members may be provided with an armrest—there may be a front armrest support unit pivotally secured at one end to the common pivotal connection of the front support unit, seat rail and connecting link; a rear armrest support unit pivotally secured at one end to the backrest rail above the location at which the backrest rail is pivotally secured to the seat rail; and the front and rear armrest support units may be pivotally secured together at their other ends.

The folding strut arrangement may include a pair of strut members pivotally secured together mid-way along their lengths, with their opposed front ends being mounted at a different height than their opposed rear ends. The pivotal connection may be a sprung loaded joint but need not be sprung loaded if the strut members are sufficiently resilient to permit flexing along their lenghts. The side frames or the strut members or both need to accommodate the increased overall length of the strut members in the collapsed condition. Front ends of the strut members may be mounted to the lower frame units, possibly at or spaced away from the locations at which the lower frame units are pivotally secured to the front support units. Rear ends of the strut members may be mounted to the backrest rails, possibly at locations between those at which the backrest rails are pivotally secured to the seat rails and the back support units. Alternatively, the rear ends of the strut members may be mounted to the back support units, possibly at the same locations as the connecting links are mounted to the back support units.

The above-noted four mountings must each allow rotational and pivotal movement in two planes. For example, each of the mountings may include a stud extending axially from a base of a bifurcated portion whose free ends remote from the stud are pivotally secured to an end of one of the strut members of the folding strut arrangement for pivotal movement about an axis perpendicular to and intersecting the axis of the stud. This configuration has the effect of relating the collapsing movements of the folding wheelchair, so that the side frames are collapsed in the height direction simultaneously to being collapsed in the width direction of the folding wheelchair, to achieve a very compact package.

The folding strut arrangement may alternatively or additionally include a pair of strut members pivotally secured together mid-way along their lengths, possibly with their opposed upper ends being mounted to the backrest rails, and their opposed lower ends being mounted to the back support units. The above-noted four mountings must again each allow rotational and pivotal movement in two planes. The mountings may thus again be of the above-noted construction.

The folding lock arrangement may include front and rear hinged braces. The front brace may be pivotally secured at each end to the front support units and hinged in the centre to a latch for resisting accidental collapse. The rear brace may be of similar construction and be pivotally secured at each end to the backrest rails and hinged in the centre to a further latch for resisting accidental collapse.

BRIEF DESCRIPTION OF THE DRAWINGS

Several folding wheelchairs, in accordance with the present invention, will now be further described, by way of example only, with reference to the accompanying drawings, in which:

FIGS. 2 to 4 are schematic side views of the side frames of the FIG. 1 embodiment, showing the side frames respectively in their fully erected and partially folded and fully collapsed conditions;

FIG. 5 is a front view taken in the direction of the arrow A of FIG. 4;

FIG. 6 is a perspective view of the folding strut arrangement of the FIG. 1 embodiment;

FIG. 7 is a schematic view taken along the cross-sectional line B— B of FIG. 6;

FIG. 8 is a perspective view of the folding strut arrangement of FIG. 6 as combined with two side frames without armrests but otherwise similar to those of FIG. 2;

FIGS. 9 and 10 are perspective views of the folding lock arrangement of the FIG. 1 embodiment, showing respectively a single brace at the front of the side frames and a double brace at the rear of the side frames;

FIG. 11 is a perspective view of a second embodiment of a folding wheelchair according to the present invention omitting the front and rear wheels in the interest of clarity;

FIG. 12 is a side view of a third embodiment of a folding wheelchair according to the present invention including an armrest catch and a bar-operated back release catch;

FIG. 13 is a perspective view of part of the bar-operated back release catch of the FIG. 12 embodiment.

DETAILED DESCRIPTION OF THE PREFERRED EMBODIMENTS

Figure 1:
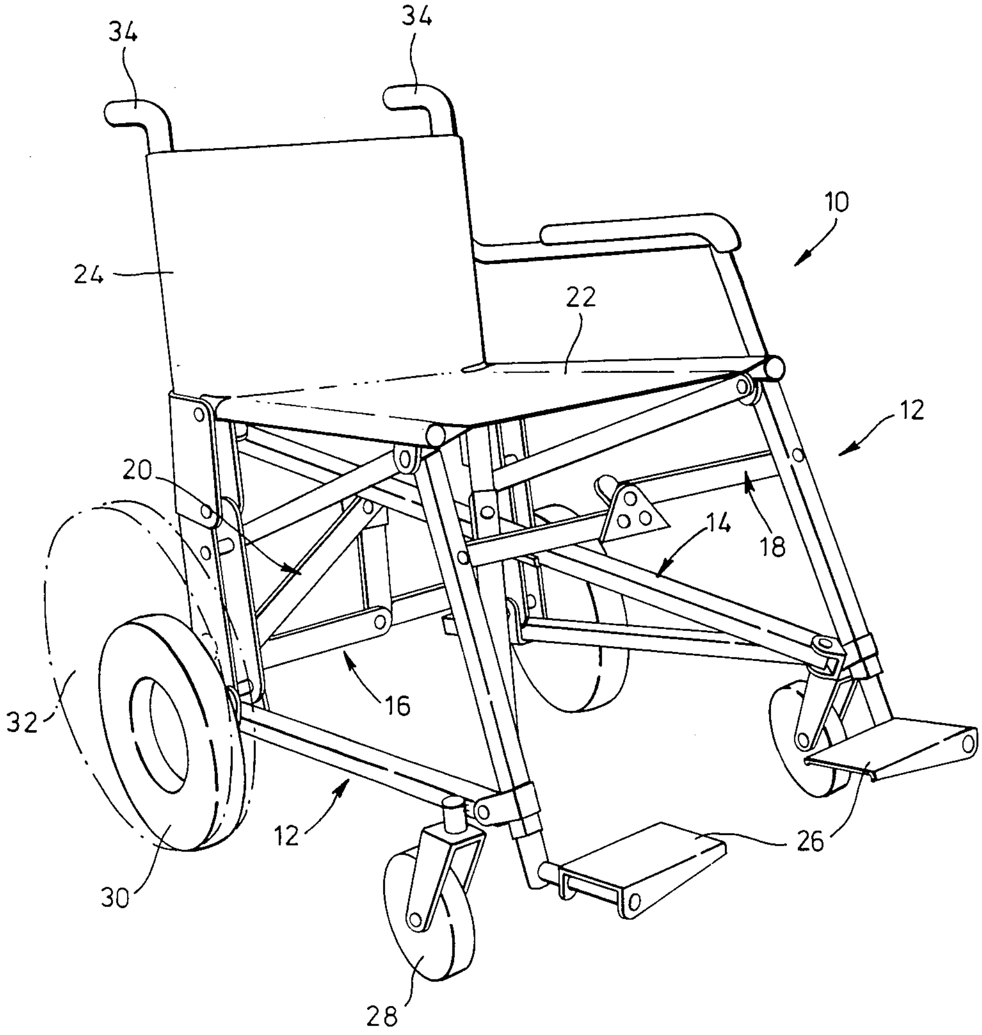
FIG. 1 is a perspective view of a first embodiment of a folding wheelchair according to the present invention omitting one armrest in the interest of clarity.
Figure 2:
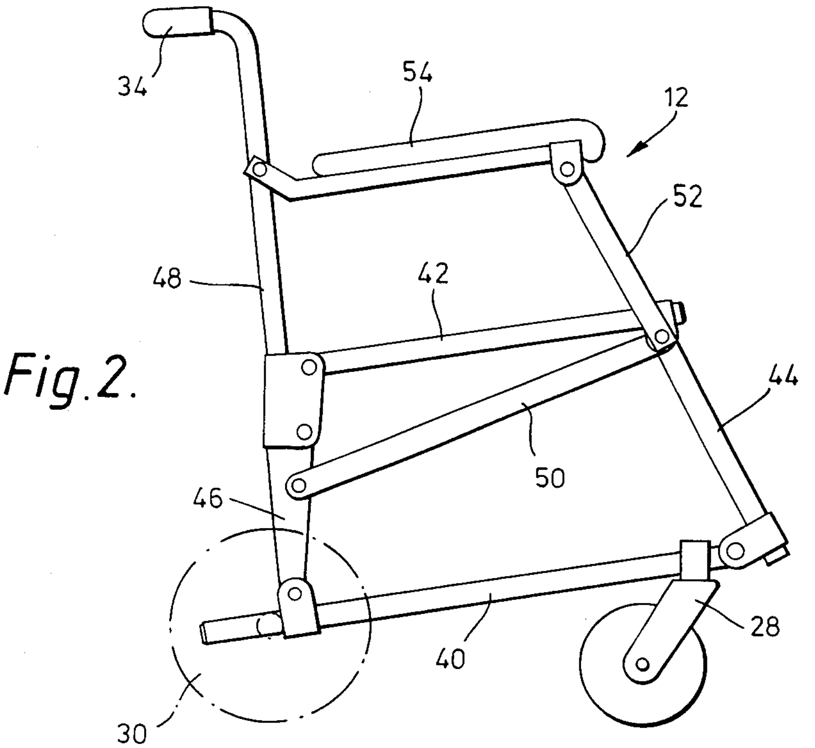
Figure 3:
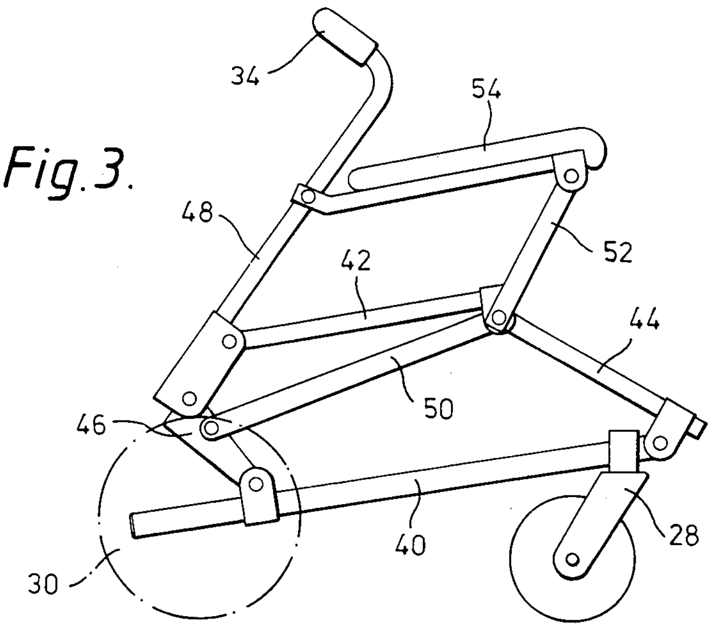

A folding wheelchair 10 is shown in the accompanying FIGS. 1 to 10. The wheelchair 10 includes a pair of side frames 12 connected by a folding strut arrangement 14 as well as a folding lock arrangement 16 including a front hinged brace 18 and a rear hinged brace 20. In the erected condition of FIG. 1 can be seen a flexible chair seat 22 and a flexible chair back 24. Each of the side frames 12 is provided with a conventional detachable footrest 26. Each of the side frames 12 is also provided with a conventional swivel-mounted castor 28 at the front and a conventional small wheel 30 at the rear. If the wheelchair 10 is to be self-propelled, the small wheel 30 may be replaced by a large wheel as indicated in phantom at 32. It is usual to provide a pair of handles 34 regardless of whether the wheelchair 10 is to be self-propelled or attendant propelled. Other features are shown more clearly in FIGS. 2 to 10 and the following discussion of FIGS. 2 to 10 should be read in conjunction with the previous discussion of those features.

Collapse of the side frames 12 is illustrated in FIGS. 2 to 5.

Each of the side frames 12 includes a lower frame unit 40, a seat rail 42, a front support unit 44, a back support unit 46, a backrest rail 48, a connecting link 50, a front armrest support unit 52 and a rear armrest support unit 54.

The folding strut arrangement 14 is illustrated in FIGS. 6 to 8, and includes a pair of identical box-section members 60, 62 pivotally secured together by a sprung loaded joint 64. More particularly, a spring 66 continuously urges the members 60, 62 apart with the spring 66 being located around a double-headed stud whose heads 68 press against gussets 70 carried by the members 60, 62. Each of the free ends of the members 60, 62 carries a mounting 72. Each of the mountings 72 includes a stud 74 extending axially from a base of a bifurcated portion 76 which is pivotally secured to the associated member about an axis orthogonal to the axis of the stud 74. The studs 74 are rotatably secured to the side frames 12.

The folding lock arrangement 16 is illustrated in FIGS. 9 and 10. The front hinged brace 18 is shown in FIG. 9 with a latch 80 for resisting accidental collapse of struts 82. The rear hinged brace 20 is shown in FIG. 10 with parallel struts 84 and a triangulating overcentre linkage 86. It will be appreciated that the front and rear hinged braces 18, 20 are both collapsible while remaining in planes generally perpendicular to the planes of the side frames 12.

An alternative folding wheelchair 100 is shown in FIG. 11 - the side frames 12 are of the construction discussed hereinbefore, but the folding strut arrangement 14 is replaced by a non-folding and preferably resilient strut arrangement including a series of fixed struts 102, and the folding lock arrangement 16 is replaced by a lock arrangement including a pair of self-engaging and manually-releasable catches 104 (only one being visible) near the locations at which the back rest rails 48 are pivotally secured to the back support units 46.

FIGS. 12 and 13 show another folding wheelchair 120 which is based on that shown in FIG. 11 but includes an armrest catch 122 and a bar-operated back release catch 124. The two side frames are again connected by a non-collapsible strut arrangement including a series of fixed struts. However, the two catches 104 of the folding lock arrangement are replaced by the single catch 124 which includes a bar 126 spanning the rear of the wheelchair 120 and pivotally secured at each end to one of the backrest rails 48'. A spring 128 continuously urges a pin 130 projecting outwardly from the bar 126 into abutment with the backrest rail 48'.

In the erected condition of the wheelchair 120, a hook defining portion 132 of the bar 126 lockingly engages with the connecting link 50' where it is pivotally secured to the back support unit 46'. To enable the wheelchair 120 to be collapsed, the bar 126 is lifted, possibly by the foot of an attendant, to move the pin 130 against the restoring force of the spring 128, and simultaneously release the hook defining portion 132 of the bar 126 from the connecting link 50'. The two side frames can then be collapsed until the armrest catch 122 operates to retain the wheelchair 120 in its collapsed condition. The armrest catch 122 is pivotally secured to the underneath of the rear armrest support unit 54' and is spring loaded so that, in the collapsed condition of the wheelchair 120, it lockingly engages with what had been the lower end of a tube forming the front armrest support unit 52'. The armrest catch 122 needs to be released to allow the wheelchair 120 to be re-erected.

Figure 14:
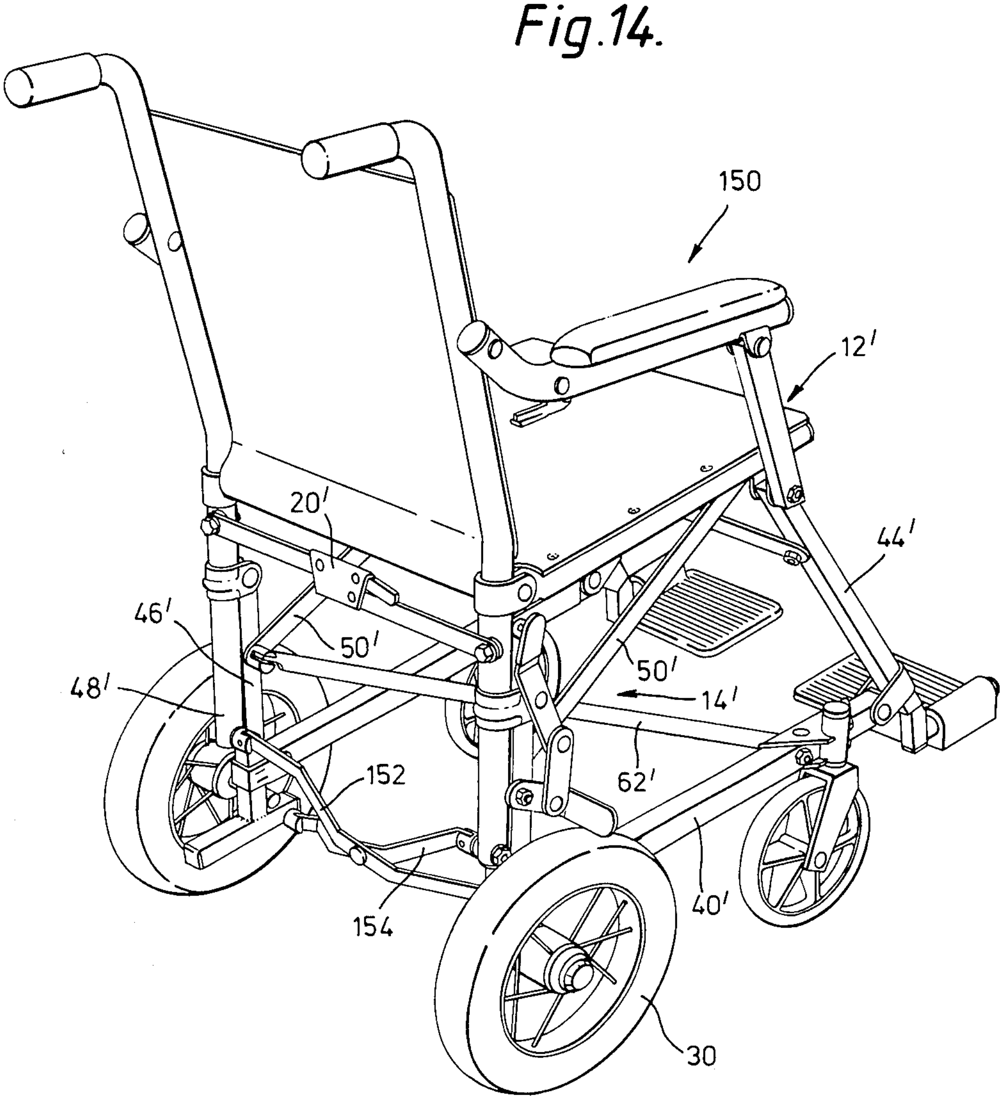
FIG. 14 is a perspective view of a fourth embodiment of a folding wheelchair according to the present invention including, in particular, two pairs of scissor-like strut members.

Finally, FIG. 14 shows yet another folding wheelchair 150 in accordance with the present invention. The FIG. 14 embodiment is similar to the FIG. 1 embodiment in that there is a folding strut arrangement 14' which is collapsible to bring the side frames 12' into close proximity in the collapsed condition of the wheelchair 150. However, in contrast to the FIG. 1 embodiment, the opposed front ends of the strut members 60', 62' are rotationally and pivotally mounted to the lower frame units 40' at locations spaced away from the locations at which the lower frame units 40' are pivotally secured to the front support units 44', and the opposed rear ends of the strut members 60',62' are rotationally and pivotally mounted to the back support units 46' at the locations of the pivotal connections of the back support units 46' to the connecting links 50'. There is no sprung loaded joint mid-way along the lengths of the strut members 60',62'. Moreover, the rear hinged brace 20 of the FIG. 1 embodiment is replaced in the FIG. 14 embodiment by a single hinged brace 20' similar to the front hinged brece 18. A further significant difference is that an additional pair of strut members 152,154 is provided which are pivotally secured together mid-way along their lengths. Their opposed upper ends are rotationally and pivotally mounted to the backrest rails 48', and their opposed lower ends are rotationally and pivotally mounted to the back support units 46'.

We claim:

1. A folding wheelchair, comprising: a pair of side frames, each having a portion carrying part of a seat and a portion carrying a pair of wheels, and each including a series of members which are pivotally secured together in a manner permitting said side frames to be collapsible in their own planes to move the seat carrying portions of said side frame towards the wheel carrying portions of said side frames, wherein each of said series of members comprises: a seat rail secured to an edge part of said seat; a backrest rail secured to an edge part of a back and pivotally secured to the rear of said seat rail; a lower frame unit secured to at least a front one of said pair of wheels; a front support unit pivotally secured at one end to the front of said lower frame unit, and at its other end to the front of said seat rail; a back support unit pivotally secured at one end to the rear of said lower frame unit, and at its other end to the loewr end of said backrest rail below the location at which said backrest rail is pivotally secured to said seat rail; and a connecting link pivotally secured at one end to the pivotal connection of said front support unit to said seat rail, and at its other end to said back support unit below the location at which said back support unit is pivotally secured to said backrest rail.

2. A folding wheelchair according to claim 1, in which said lower frame unit, in each of said series of members, is secured to a rear one of said pair of wheels.

3. A folding wheelchair to claim 1, in which said back support unit, in each of said series of members, is secured to a rear one of said pair of wheels.

4. A folding wheelchair according to claim 1, in which each of said series of members further comprises an armrest including a front armrest support unit one end of which is pivotally secured to one end of a rear armrest support unit.

5. A folding wheelchair according to claim 4, in which the other end of said front armrest support unit is pivotally secured to the common pivotal connection of said front support unit, said seat rail and said connecting link, and the other end of said rear armrest support unit is pivotally secured to said backrest rail above the location at which said backrest rail is pivotally secured to said seat rail.

6. A folding wheelchair according to claim 1, in which said side frames are connected by a fixed strut arrangement which is not capable of collapse.

7. A folding wheelchair according to claim 1, in which said side frames are connected by a folding strut arrangement which is capable of collapse.

8. A folding wheelchair according to claim 7, in which said folding strut arrangement includes a pair of strut members pivotally secured together mid-way along their lengths, with their opposed front ends being rotationally and pivotally mounted to said lower frame units, and their opposed rear ends being rotationally and pivotally mounted to said backrest rails.

9. A folding wheelchair according to claim 7, in which the front ends of said strut members are mounted to the pivotal connections of said lower frame units and said front support units, and the rear ends of said strut members are mounted to said backrest rails at locations between those at which said backrest rails are pivotally secured to said back support units and said seat rails.

10. A folding wheelchair according to claim 7, in which said folding strut arrangement includes a pair of strut members pivotally secured together mid-way along their lengths, with their opposed front ends being rotationally and pivotally mounted to said lower frame units, and their opposed rear ends being rotationally and pivotally mounted to said back support units.

11. A folding wheelchair according to claim 10, in which the front ends of said strut members are mounted to said lower frame units spaced away from the locations at which said lower frame units are pivotally secured to said front support units, and the rear ends of said strut members are mounted to the pivotal connections of said back support units and said connecting links.

12. A folding wheelchair according to claim 7, in which said folding strut arrangement includes a pair of strut members pivotally secured together mid-way along their lengths, with their opposed upper ends being rotationally and pivotally mounted to said backrest rails, and their opposed lower ends being rotationally and pivotally mounted to said back support units.

13. A folding wheelchair according to claim 8, in which said folding strut arrangement additionally includes a pair of strut members pivotally secured together mid-way along their lengths, with their opposed upper ends being rotationally and pivotally mounted to said backrest rails, and their opposed lower ends being rotationally and pivotally mounted to said back support units.

14. A folding wheelchair according to claim 10, in which said folding strut arrangement additionally includes a pair of strut members pivotally secured together mid-way along their lengths, with their opposed upper ends being rotationally and pivotally mounted to said backrest rails, and their opposed lower ends being rotationally and pivotally mounted to said back support units.

15. A folding wheelchair according to claim 7, in which said side frames are also connected by a folding lock arrangement including front and rear hinged braces.

16. A folding wheelchair according to claim 15, in which said front brace is pivotally secured at each end to said front support units and hinged in the centre to a latch, and said rear brace is pivotally secured at each end to said backrest rails and hinged in the centre to a further latch.

* * * * *